Sept. 8, 1959     I. JEPSON ET AL     2,903,552
AUTOMATIC PERCOLATOR
Filed Sept. 17, 1953     3 Sheets-Sheet 1
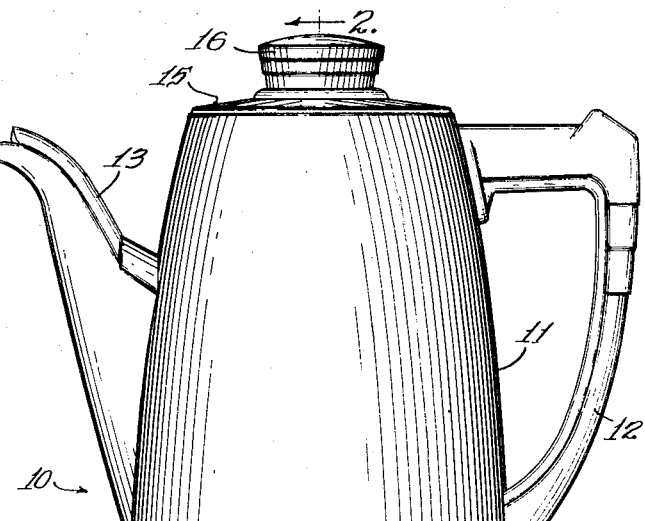
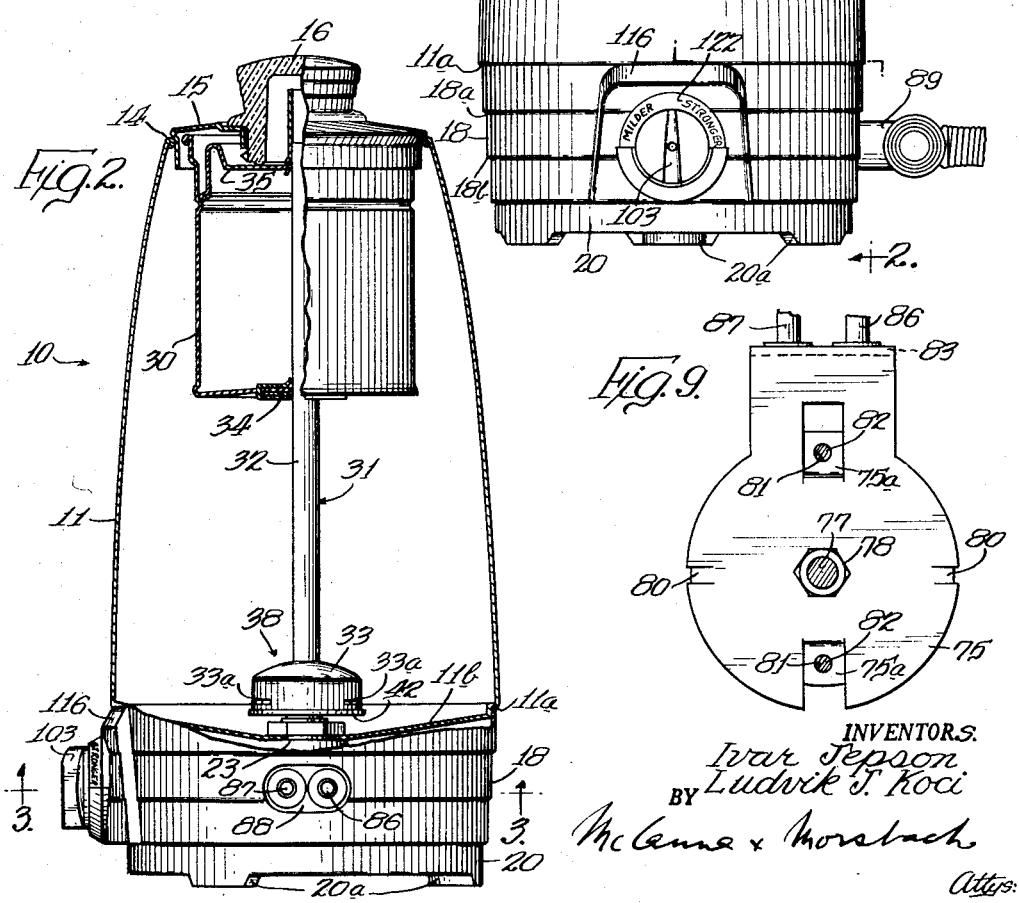
INVENTORS.
Ivar Jepson
Ludvik J. Koci
BY McCanna & Morsbach
Attys.

Sept. 8, 1959     I. JEPSON ET AL     2,903,552
AUTOMATIC PERCOLATOR
Filed Sept. 17, 1953     3 Sheets-Sheet 2
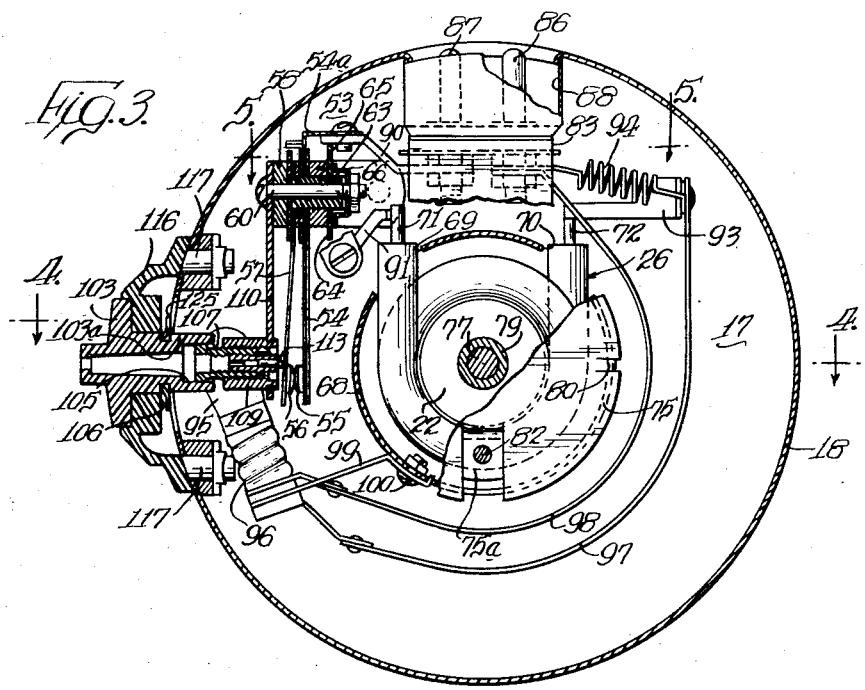
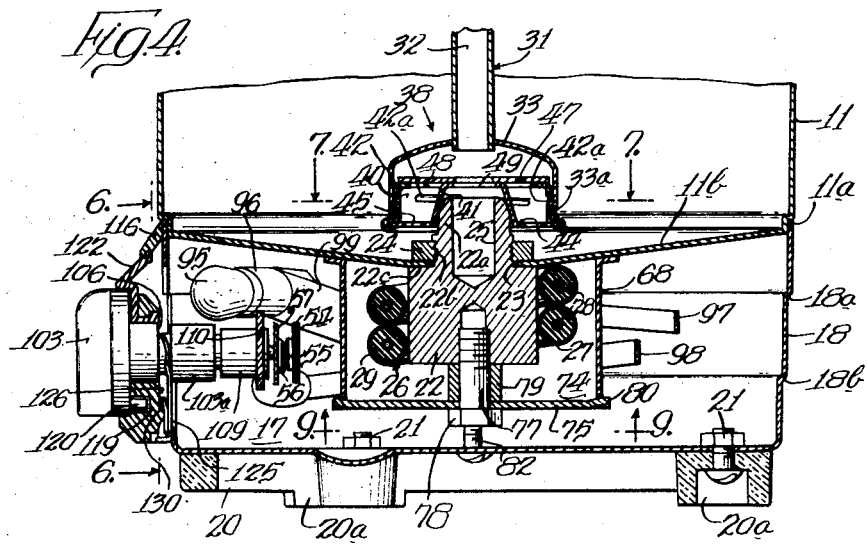
INVENTORS.
Ivar Jepson
BY Ludvik J. Koci

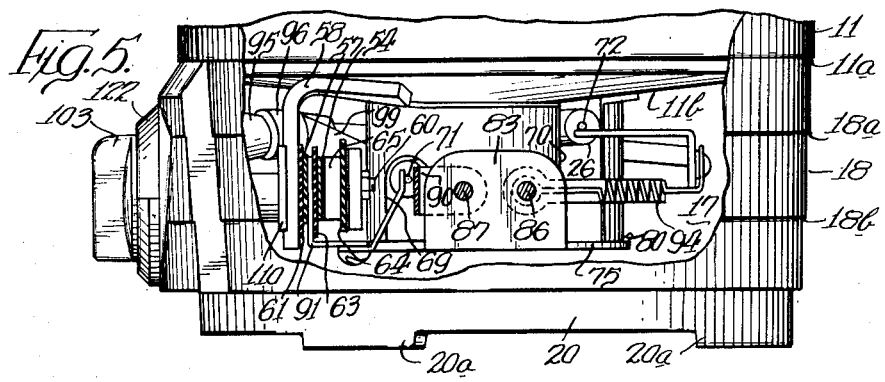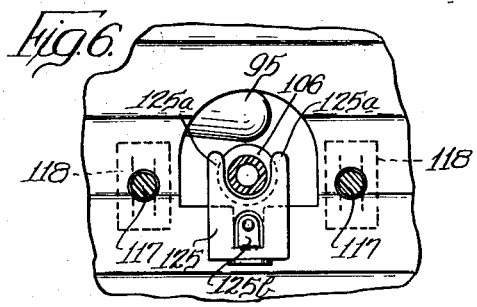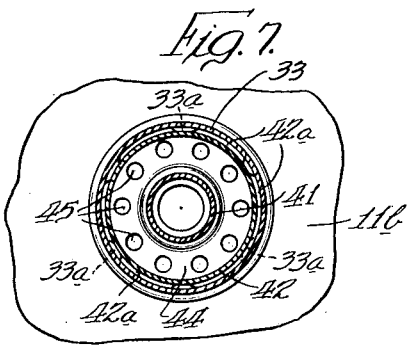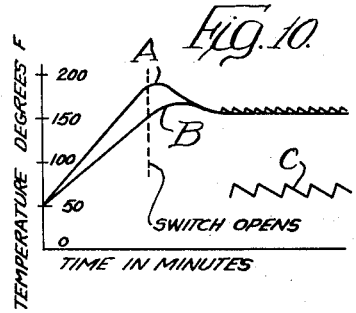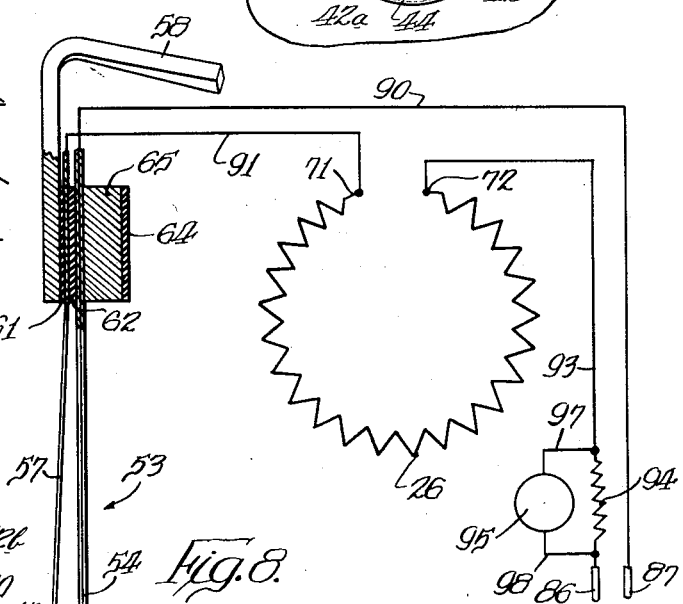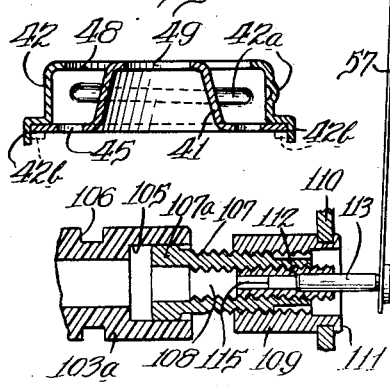

United States Patent Office 2,903,552
Patented Sept. 8, 1959

2,903,552

AUTOMATIC PERCOLATOR

Ivar Jepson, Oak Park, and Ludvik J. Koci, Hinsdale, Ill., assignors to Sunbeam Corporation, Chicago, Ill., a corporation of Illinois Application September 17, 1953, Serial No. 380,722

8 Claims. (Cl. 219—44)

The present invention relates to an electric percolator, and, more particularly, to an improved control arrangement for such an electric percolator, which control arrangement might also be used for controlling other electrically heated appliances particularly adapted to the preparation of beverages.

There are several types of coffeemaking appliances on the market today, each of which uses a somewhat different principle of operation. One of these coffeemaking devices is generally referred to as the vacuum type coffee maker, a specific example of which is that disclosed and claimed in United States Letters Patent No. 2,312,555 Jepson, granted March 2, 1943, and assigned to the same assignee as the present application. The arrangement disclosed in the above-mentioned Jepson patent is one that is fully automatic in that once the coffee maker is set to operate the coffee will be brewed, and upon completion of the brewing operation the completed coffee will be maintained at a uniform serving temperature, which is lower than the brewing temperature. Another of these different types of automatic coffee making devices comprise what has been commonly termed a percolator, which operates upon a somewhat different principle than the vacuum type coffee maker. In the percolator the coffee grounds are retained in a basketlike arrangement in the upper part of the coffeemaking vessel, and by means of a sort of pumping action hot water is caused to move upwardly through a tube into the basket, where the hot water encounters the ground coffee. This pumping or percolating action is continued until the desired strength of brew is obtained. There are, of course, still other coffeemaking devices operating on still different principles, one of which is commonly referred to as the drip type of coffeemaking device. The present invention, however, is primarily concerned with a coffeemaking device embodying the so-called percolator principle of making coffee. It should be understood, however, that although specifically disclosed as applied to a fully automatic electric percolator, the present invention may have other application, and the specific application illustrated is by way of example only.

The public has come to require that an automatic coffeemaking device include means for not only automatically brewing the coffee at a relatively high temperature, but thereafter terminating the brewing operation at a selectively desired time and subsequently maintaining the brewed coffee at a temperature below the brewing temperature, which lower temperature is a desirable serving temperature. An arrangement for accomplishing this, which has proven to be very successful in connection with the vacuum type coffee maker, is that disclosed in the above-mentioned Jepson patent. Automatic electric percolators must be sold on the market at a price substantially below that for which fully automatic vacuum type coffee makers are sold, and hence it is essential that control means for performing the desirable functions noted above be simple, compact and inexpensive. For an electric percolator there should be provided electric control means which will permit a high temperature operation during the brewing or percolating period for a period of time which is variable, and selected by the user in accordance with the strength of the coffee desired. This control means should subsequently maintain the coffee at a serving temperature without any possibility of causing a repercolating operation. Such electric percolators usually having a heating element which may have a rating of the order of four hundred watts in order to produce the desired coffee percolation within a minimum period of time. To maintain the coffee at a desired serving temperature requires supplying electrical energy of the order of about one-tenth or less of the four hundred watts mentioned above. Heretofore it has been common practice to provide a second or third heating element of a relatively low fixed wattage for the electric percolator to supply the heat losses by virtue of a low ambient temperature and to maintain the coffee at a desired serving temperature. Unfortunately, such fixed wattage elements, which might be of the order of forty watts or thereabouts, are unsatisfactory due to the large number of variable conditions that are likely to be encountered. For example, electrical distribution circuits operate at variable voltages which will, of course, cause a substantial variation in the temperature at which the coffee is maintained for serving if a fixed wattage element for this purpose is employed. Likewise, variable quantities of liquid or coffee are likely to be involved, since it is common practice to use the coffeemaking device for making anywhere from one cup to eight cups or ten cups, and, obviously, a heating device which will maintain a desirable serving temperature as far as two cups of liquid are concerned will not be satisfactory in the event that eight or ten cups are to be made. Even more of a factor in making a fixed wattage element undesirable for supplying the heat losses necessary to maintain a uniform serving temperature in connection with an electric percolator is the variation in ambient temperature encountered. If the coffeemaking device is subjected to drafts, for example, at one time, and to no drafts at another time, a marked difference in the serving temperature that will be maintained by a fixed wattage heating element for this purpose will be observed. It is essential, therefore, that a control means be provided which is independent of the variables noted above insofar as maintaining the coffee at a desirable serving temperature is concerned. It is, furthermore, desirable from the standpoint of providing a device which can be marketed competitively that the control means employ only a single switch and a single heating element controlled by a single bimetallic element which will give all the necessary control in making the coffee and in subsequently maintaining it at a desired serving temperature.

Electric percolators comprise some form of pump to force the water into the coffee basket. Such pumps have heretofore been commonly made of aluminum die castings, and after only a short use have been found to corrode to such an extent that replacement is often necessary. It would be desirable to provide a pump which will not corrode and yet which can be made in an inexpensive manner, and which can be assembled and disassembled with ease.

Accordingly, it is an object of the present invention to provide a new and improved electric percolator.

It is another object of the present invention to provide an improved control means for a coffeemaking device which is simple and inexpensive, and which will provide fully automatic control for such coffeemaking device.

It is another object of the present invention to provide an electric percolator in which selectively operable control means permit the user to select any desired coffee from the standpoint of strength, and in which upon completion of the coffeemaking operation the coffee liquid will be maintained at a desired serving temperature irrespective of the surrounding atmosphere, the amount of coffee being made, the variations in voltage of the supply line, etc.

Still another object of the present invention resides in the provision of a fully automatic control means for an electric percolator which comprises a single switch and a single heating element for assuring such fully automatic operation including maintaining the coffee liquid at a desired serving operation.

It is another object of the present invention to provide an improved pump and method of making the same for an electric percolator which will not corrode, which is simple and inexpensive to manufacture, and foolproof in operation.

Still another object of the present invention resides in improved heating means for an electric percolator which will insure proper heating and control under all conditions.

Further objects and advantages of the present invention will become apparent as the following description proceeds, and the features of the novelty which characterize the invention will be pointed out with particularity in the claims annexed to and forming a part of this specification.

For a better understanding of the present invention, reference may be had to the accompanying drawings in which:

Fig. 1 is an elevational view of an electric percolator embodying the present invention;

Fig. 2 is a view partly in section taken substantially along line 2—2 of Fig. 1;

Fig. 3 is a greatly enlarged sectional view taken on line 3—3 of Fig. 2;

Fig. 4 is a sectional view taken on line 4—4 of Fig. 3, assuming that Fig. 3 shows the complete structure;

Fig. 5 is an enlarged view of a portion of Fig. 2 with certain parts thereof cut away;

Fig. 6 is a sectional view taken on line 6—6 of Fig. 4, assuming that Fig. 4 shows the complete structure;

Fig. 7 is a sectional view with certain portions cut away, taken on line 7—7 of Fig. 4, again assuming that Fig. 4 shows the complete structure;

Fig. 8 is a somewhat schematic diagram illustrating the electrical circuit of the coffeemaking device of the present invention and showing in sectional view certain detailed features of the control mechanism;

Fig. 9 is a partial view looking in the direction of the arrows 9—9 of Fig. 4, assuming that Fig. 4 shows the complete construction;

Fig. 10 is a curve diagram to aid in understanding the present invention; and

Fig. 11 is a sectional view of two parts which are united to form the valve assembly of the present invention in order to aid in understanding the method of manufacture thereof.

The electric percolator of the present invention utilizes principles of coffeemaking which are well-known, and except for certain features described in detail hereinafter the present invention is primarily concerned with the control means for such an electric coffeemaking device. As in prior electric coffee percolators, a small trapped volume of liquid is heated, so that percolation occurs almost instantly. The problem which has always existed in connection with such electric percolators embodying some "keep warm" device for maintaining the coffee at a desired serving temperature has generally centered around preventing the device from repercolating, which is very undesirable because it causes the coffee to become stronger and stronger. We have discovered that if one cycles or pulses the current supplied to the main heating element in a desired manner, percolation will be prevented. As a matter of fact, with a four hundred watt heating element, we have discovered that if the heating element is energized for a few seconds during each minute, the four hundred watt element may be used as a satisfactory "keep warm" element. The present invention is concerned with a control means which will not cycle the main heating element during the percolation period, but after the desired percolation period, which may be a variable period, the control means cycles the heating of the heating element in a manner to keep the coffee warm. The present invention employs a thermostatic control means which is responsive to two things: first, the average temperature of the coffee liquid, and, secondly, to heat produced by virtue of current flowing through the bimetallic element itself. The temperature rise due to the current flowing in the bimetallic element itself is such as to be only a matter of a degree or two. Consequently, during the percolating operation, when the temperature of the brewing coffee is relatively low, the current flowing through the bimetallic element has little or no effect. Also, in order to insure that the desired high temperature is initially reached, suitable means are provided which will cause a lagging response. Once the percolating operation is complete, however, the cyclic operation of the bimetallic element is primarily responsive to the small temperature increase produced by current flowing through the bimetal above the relatively constant temperature of the coffee liquid.

Referring now to the drawings, there is illustrated in Fig. 1 the electric percolator of the present invention, generally designated by the reference numeral 10. The percolator 10 comprises a fluid container 11, preferably formed of spun copper or the like, which fluid container is provided with a suitable handle 12 formed of insulating material which might comprise a phenolic resin of some sort. A spout member 13, which may comprise a die casting, is attached to the fluid container 11 in a conventional manner to permit pouring liquid contained in the vessel 11. The shape of the vessel 11 can best be observed from the sectional view of Fig. 2 of the drawings. Preferably the vessel 11 is provided with an open top, a suitable rolled edge 14 defining a circular opening. This opening is preferably closed by a suitable cover 15, which cover is provided with a central cover knob 16. The knob 16, as is conventional with percolators, is preferably formed of clear glass, so that it will permit viewing the operating condition of the percolator by the user thereof. The knob 16 is readily removable in a manner well understood by those skilled in the art, so that in the event of breakage it may be replaced in a simple manner.

For the purpose of defining a control chamber 17 beneath the vessel 11, there is provided a somewhat cup-shaped member 18 formed of brass or the like, secured in the manner described hereinafter to the bottom of the vessel 11. As is best shown in Fig. 4 of the drawings, the cup-shaped member 18, which might be termed the bottom cover member, appears to provide a continuation of the vessel 11. Actually, the vessel 11 is provided at its lower end with an annular shoulder portion 11a, against which the open end of the cup-shaped member 18 is seated. Moreover, the cup-shaped member 18 is illustrated as having a plurality of annular shoulders 18a and 18b which provide a pleasing appearance and look just like the shoulder 11a. As may be observed from Figs. 1 and 5, the annular shoulders 11a, 18a and 18b, and the sort of shoulder formed by the bottom of member 18, provide a pleasing appearance giving the percolator 10 the appearance of having the lower portion thereof defined by a plurality of sections of decreasing diameter when moving downwardly from the shoulder 11a. As best shown in Fig. 4 of the drawings, the vessel 11 is provided with an inclined bottom 11b extending downwardly from the shoulder 11a to a central portion which defines the lowermost portion of the container 11.

In order to support the percolator 10 from a suitable support, there is secured to the bottom cover member 18 a base member 20 which may be formed of a suitable insulating material such as a phenolic resin or the like molded to the desired configuration to provide a ring member having a plurality of spaced integral legs 20a. As best shown in Fig. 4 of the drawings, the base 20 is preferably secured to the bottom cover member 18 by suitable fastening means 21. It will be apparent that the base 20 will thermally insulate the percolator 10 from any surface upon which it is placed. Preferably, the base 20 and the handle 12 have the same color so as to provide a pleasing appearance. Likewise, the vessel 11, the bottom cover member 18, and the cover 15 are suitably plated to provide a highly polished pleasing appearance. In a commercial embodiment constructed in accordance with the present invention, the percolator 10 was provided with a black base 20 and handle 12, while the body portion thereof was chrome-plated. Obviously, the particular configuration or appearance of the percolator 10 forms no part of the present invention, but is disclosed and claimed in a copending design application, now Patent Des. 173,731, granted December 28, 1954 and assigned to the same assignee as the present application.

As is common practice in electric percolators, suitable electric heating means are provided for heating liquid contained within the container 11. It is desirable, however, to provide heating means which will insure percolation within a short time, such as within one minute after the electric heating means is connected to a source of electric energy. To this end and in accordance with the present invention, there is provided a brass or other suitable thermal conducting stud 22 in the form of a substantial mass of metal having one end in the form of an extension of reduced cross section designated by the reference numeral 22a. This extension of reduced cross section, as is best shown in Fig. 4 of the drawings, is adapted to be inserted within the centrally defined opening 23 in the bottom 11b of the liquid container 11. The extension 22a is provided with a threaded portion 22b to receive a suitable nut 24 whereby the shoulder portion 22c of the stud 22 is clamped against the underside of the bottom 11b in a manner to define a liquid-tight vessel 11. The stud 22 is provided with a pump or steam generating chamber 25 of small volume in the open end thereof, which opens into the vessel 11.

In order to heat the liquid in the liquid container 11, and specifically to heat any liquid within the steam generating chamber 25, there is provided a suitable heating element 26 illustrated as in good heat exchange relationship with the stud 22. Specifically, the heating element 26 is illustrated as disposed in a coil of a few turns around the stud 22, which coil is preferably brazed or otherwise secured to the stud 22. As illustrated, the heating element 26 is preferably of the well-known sheathed form comprising an outer metal sheath 27 within which is disposed a resistance element 28, preferably in the form of a spiral coil of resistance material. The resistance element 28 is centrally disposed of the sheath 27, and is supported in that position by suitable electrical insulating material 29 which also provides a good heat conductor. This material 29 may comprise fused magnesium oxide, which is a good heat conductor and at the same time provides the necessary electrical insulation. With this construction it will be apparent that the heating element 26, which for a particular embodiment of the present invention may have a rating of four hundred watts, will provide a very high heat for the steam generating chamber 25, and, subsequently, will heat the liquid within vessel 11.

With the heating arrangement of the present invention, the heat supplied to the vessel 11 is concentrated at the center to insure fast percolation even though the water in vessel 11 is cold and remains cold for some time after percolation begins. The amount of heat fed to the pump well 25 is fairly critical, and, consequently, the depth of well 25 is critical. We have found that if well 25 is extended too far into stud 22 too much heat is supplied, accompanied by percolation which is too violent. On the other hand, if the well 25 does not extend into close enough proximity with the heating element 26, it may take an undesirably long time for percolation to begin. It will also be appreciated that the electric heating arrangement provided and described above not only provides very desirable heating of the device, but further is inexpensive to manufacture and assemble. The stud 22, for example, can be manufactured by employing an automatic screw machine in a rather simple manner.

To make coffee by the percolator principle, there is provided within the chamber 11 the conventional basket or coffee grounds container 30 supported near the upper part of the vessel 11 by means of the basket tube assembly generally designated as 31 and comprising a tube 32 secured at the lower end to a valve cover 33. The basket 30 is provided with a central aperture through which the upper end of the tube 32 extends. In order to support the basket 30 from the tube 32, there is provided a suitable basket washer 34 secured as by silver solder or the like to the tube 32. Preferably, a suitable cover member 35 is provided for the basket 30 which like the basket 30 includes a plurality of small openings to permit the liquid to pass through the coffee grounds which are placed in the basket 30 and to return into the vessel 11.

To force the liquid through the tube 31, which tube performs a dual function, namely, supports the basket 30 and also conveys fluid thereto, there is provided a pump and valve arrangement generally designated by the reference numeral 38, and best shown in Figs. 4 and 7 of the drawings. This pump and valve assembly comprises a support arrangement defining a valve seat assembly which includes two parts joined to define an annular chamber 40. This chamber 40 is defined around a frusto-conical portion of one part 41 adapted to seat on the end of the extension 22a of the stud 22. Integrally connected to the frusto-conical wall portion of the part 41 is a peripheral flange 44 defining the bottom of the annular chamber 40. The annular chamber 40, in addition to being defined by the part 41 including the integral flange 44, is defined by an outer part 42 having a plurality of elongated substantially horizontal deformed ridges 42a defined therein, so that the valve cover 33 may be secured thereto with the ridges 42a acting like a thread. Actually, the valve cover 33 is provided with a plurality of dimples 33a which engage the ridges 42a. The ridges 42a are disposed at a very slight angle with the horizontal, as viewed in Fig. 4 of the drawings, so that, effectively, it is a sort of thread, and by means of a small turning motion of the valve cover 33 relative to the valve seat assembly, the two may be locked together. Disposed in the bottom wall 44 are a plurality of spaced openings 45, best shown in Figs. 4 and 7 of the drawings, which permit fluid to enter the annular chamber 40.

The valve seat assembly which, in accordance with the present invention, comprises the two parts 41 and 42, has in prior art arrangements generally comprised a unitary aluminum casting with machined threads engageable with the cover 33. We have found that with such prior art arrangements so much corrosion occurs that it is often difficult or impossible to separate the cover 33 from the valve seat assembly. In accordance with the present invention, the cover 33 and the valve seat assembly are made of stainless steel, thereby eliminating the corrosion problem. To reduce the manufacturing cost of the strainless steel valve seat assembly, it is made of two simple stampings 41 and 42, as best shown in Fig. 11 of the drawings, which can readily be formed into the shapes of Fig. 11 by simple forming operations. The two parts 41 and 42 are then nested together, as shown in Fig. 11, and the extension 42b of part 42 is rolled over or clinched to the dotted line position to join these two parts 41 and 42 together into a unitary structure. It will be noted that an annular opening 48 is defined at the top of the assembly, and the surfaces surrounding this opening which define a valve seat are lapped to provide a satisfactory valve seat. Thus, there has been provided an arrangement which is corrosionproof and still inexpensive to manufacture.

To control the flow of liquid flowing through tube 32 and, hence, through openings 45, there is provided an annular valve ring 47, preferably also formed of corrosion-free material such as stainless steel, somewhat in the form of a flat washer, normally closing the annular opening 48 in the top of the annular chamber 44. The valve ring 47 is maintained in seating engagement with the valve seat surrounding annular opening 48 by virtue of the effect of gravity. Also, a central opening 49 in the valve seat assembly connects the recess 25 with the tube 32. It will be appreciated that when the basket tube assembly 31, which includes the valve cover 33, is secured to the valve seat assembly, there is provided a unitary structure which may be inserted into the top opening of the vessel 11 with the tapered wall portion of the part 41 engaging the extension 22a. By employing the tapered wall portion of the part 41, the user of the percolator will have no difficulty in finding the extension 22a, which has a rounded top edge, as is clearly shown in Fig. 4 of the drawings, thereby permitting ready seating of the entire assembly, including the basket 30, the basket tube assembly 31, and the valve seat assembly attached thereto.

By virtue of the fact that the bottom 11b of the vessel 11 tapers toward the center thereof, and the stud 22 extends some distance above this bottom surface, the openings 45 will be a slight distance above the bottom, so that any liquid contained within the chamber 11 will, by the hydrostatic head thereof, enter chamber 44 and lift the valve member 47 thereby to permit liquid to fill the space within the cover 33, including the annular chamber 40, as well as the space within the stud 22 heretofore referred to as the steam generating chamber 25. It will, furthermore, be apparent that upon energization of the heating element 26, this small quantity of water in the chamber 25 will be converted to steam, or at least heated substantially so as to produce a pressure within the cover 33 maintaining the annular valve member 47 closed. Thereby this small quantity of water is rapidly heated and forced through the tube 32 into the basket 30. The pressure within the cover 33 then decreases to atmospheric pressure, and the hydrostatic pressure within the water vessel 11 again forces the valve member 47 from its seat to permit refilling of the space within cover 33. Effectively, therefore, there has been provided a sort of injector pump which pumps water from the container 11 up through the tube 31 so as to infuse the coffee grounds within the basket 30. The valve member 47 must be sufficiently light so as to open even though relatively small quantities of coffee, such as one or two cups, are being made in the percolator 10 of the present invention.

As was discussed above, it is desirable to provide automatic control means for the heating element 26, so that coffee of the desired strength is made by heating the liquid to a relatively high temperature, and thereafter the completed coffee is maintained at a lower serving temperature. It is, of course, absolutely essential that once the pumping action or percolating action has been terminated, with the coffee at the proper strength, no possibility of repercolating the coffee can occur. Accordingly, the control means of the present invention is disposed within the chamber 17 defined beneath the vessel 11 and within the cup-shaped housing 18. Since the control means involves controlling the liquid in vessel 12 in two temperature ranges by means of a single heating element 26, obviously it is necessary to have some thermal responsive device including a switch for this purpose. In accordance with the present invention, only a single set of contacts, controlled by a single bimetallic element, control the energization of the single heating element 26 for providing the initial high temperature necessary to make the coffee and thereafter maintaining the coffee at a lower serving temperature. To this end there is provided a bimetallic switch mechanism, generally designated by the reference numeral 53, including a bimetallic element 54 mounted in cantilever fashion with a movable contact 55 connected to the free end thereof. A relatively stationary contact 56 is supported on a suitable switch leaf 57, which is also supported at one end.

As illustrated, a suitable L-shaped heat lug 58, best shown in Figs. 3, 5 and 7 of the drawings, is provided, which is welded or brazed to the bottom 11b of the vessel 11, as indicated in Fig. 5 of the drawings. This heat lug 58 is preferably formed of a very good conductor of heat such as copper or the like. Since it is desirable to control the average temperature of the liquid within the container 11 during the "keep warm" period, the lug 58 is preferably secured to the bottom 11b at a point somewhere between the center and the outer periphery of the vessel 11, in any event somewhat removed from the center section of the vessel 11, where the heat is initially applied. Since the switch leaf 57 and bimetallic element 54, as employed in the present invention, both conduct current supplied to the heating element 26, it is necessary that they be insulated from each other and from the support, including the lug 58. Moreover, to support the elements from the lug 58, there is provided a suitable fastening means 60 extending through the lug 58, as well as through the switch leaf 57 and bimetallic element 54, and also through suitable insulating members 61 and 62 which insulate the switch leaf 57 from the supporting lug 58, and the switch leaf 57 from the bimetallic element 54, respectively. The insulating members 61 and 62 may be made of a glass laminate or any other suitable insulation. Also, a suitable ceramic insulating sleeve 63 surrounds the fastening means 60 to insulate the same from the conducting elements comprising the leaf spring 57 and the bimetallic element 54. This assembly also includes a suitable lag block 65 comprising an important feature of the present invention, which is in intimate thermal engagement with the bimetallic element 54 and is insulated from the fastening means 60 by the insulating means 63 which extends therethrough. An additional insulating member 64, engaged by a cup washer 66, makes sure that the fastening means 60 is completely insulated from the current conducting elements. The cup washer permits using sleeves 63 which are not of identical lengths as is common with such ceramic insulating sleeves.

From the above discussion it will be apparent that when the heating element 26 is continuously energized the temperature of the sheath 27 may reach 500° or 600° F. On the other hand, during the period when the heating element 26 is cyclically operated to supply only about ten percent of its full rating, the sheath temperature may be only 300° F. or less. This wide variation in radiation from element 26 would adversely affect the operation of bimetallic element 54 which is disposed within the chamber 52 fairly close to the heating element 26. In order to prevent heat from the heating element 26 from directly affecting the bimetallic element 54, there is provided a suitable annular shield 68 of good heat conducting material such as copper or the like, which is brazed or otherwise secured to the bottom 11b so as to more or less completely surround the heating element 26, thereby delivering the bulk of the heat generated to the liquid within cover member 33. This shield is provided with a pair of openings 69 and 70 to permit the heating element 26 to pass therethrough, whereby the terminals 71 and 72 of the heating element may be electrically connected with the control circuit and a source of electrical potential. The shield 68 defines a chamber 74, which is provided at the bottom with a closure plate 75 for closing the open lower end thereof, which closure plate is best shown in Figs. 4 and 9 of the drawings. This closure plate 75 is in some respects a bracket for supporting certain parts of the percolator 10, including the bottom cover plate 18. This bracket 75 is secured against the bottom open end of the shield 68 by suitable fastening means including a stud 77 secured to the stud 22, and a nut 78 fastened to this stud. Preferably, a sleeve 79 surrounding the stud 77 positions the bracket 75. For proper seating of the bracket, the periphery is provided with deformed ears 80, as best shown in Figs. 4 and 9 of the drawings, which also prevent turning of the bracket 75 relative to shield 68.

To permit fastening of the member 18 to the bracket 75, the latter includes integral lugs 75a, which are provided with tapped openings 81 to receive suitable fastening means 82 extending through the bottom of the cup-shaped housing member 18, whereby the same is secured to the bottom of the vessel 11 in a simple and yet readily removable manner. The bracket 75 includes a lateral projection 83 for supporting a pair of contact pins 86 and 87, providing bayonet type contacts for connection with a conventional appliance cord. These bayonet type contacts are, of course, suitably insulated from the support 83, and a plug guard 88 effectively defines a recess in the bottom cover plate 18 into which a conventional plug connector 89 (see Fig. 1) may be inserted in a manner well understood by those skilled in the art.

The electrical circuit is best shown in Fig. 8 of the drawings, although it is also clearly indicated in Fig. 3 of the drawings. As illustrated there, the contact pin 87 is electrically connected by means of a terminal lead 90 with a lateral extension 54a of the bimetallic element 54. The switch leaf 57, on the other hand, is electrically interconnected by means of a suitable connector 91, only a portion of which is shown in Figs. 3 and 5 of the drawings, to the terminal 71 of the heating element 26. The terminal 72, on the other hand, of the heating element 26 is electrically connected by means of a terminal lead 93 with one terminal of a resistor 94, which resistor is connected directly to the pin connector 86. The resistor 94 is included to provide the desired voltage drop for a suitable signal light 95 connected thereacross. It will be understood that by means of the signal light the operator will be apprised of whether or not the heating element 26 is energized. A suitable light socket 96 for the light 95 is provided, which light socket is connected by leads 97 and 98 with the terminals of resistor 94. The light socket 96 is mechanically supported by a suitable bracket 99 secured to the shield 68 by suitable fastening means 100, best shown in Fig. 3 of the drawings.

It will be appreciated that upon heating of bimetallic element 54 it will deflect to the right, as viewed in Figs. 3 and 8 of the drawings, to open the circuit between contacts 55 and 56. The particular temperature necessary to open the circuit between contacts 55 and 56 will, of course, depend upon the position of relatively stationary contact 56. Actually, contact 56 is movable to a limited extent to permit selective adjustment of the operating characteristics of the control arrangement and to permit initial factory calibration.

For the purpose of providing selective operation of the percolator 10 so that coffee of varying degrees of strength may be produced, there is provided a manual control knob 103 which includes an integral shank 103a having an enlarged hexagonal recess 105 defined in the end of shank 103a remote from the knob 103. The shank 103a is also provided with a peripheral groove 106. The knob shank 103a is preferably connected with a control rod sleeve 107 which has a hexagonal head 107a fitting within the hexagonal recess 105. The control rod sleeve 107 is provided with a longitudinally extending passageway 108 therein. The control rod sleeve is both externally and internally threaded. The external threads of the control rod sleeve 107 threadedly engage a control rod nut 109 which is supported from a suitable bracket 110. The bracket 110 is illustrated in Fig. 3 of the drawings as being supported from the heat lug 58. As illustrated, the end of the bracket 110 remote from the heat lug 58 is provided with an opening for receiving a portion of reduced cross section of the control rod nut 109, which is then peened over, as indicated at 111, to secure the same to the bracket 110.

Engageable with the internal threads of the control rod sleeve 107 is the control rod 112, which has secured to one end thereof an insulating extension 113 engageable with the switch leaf 57. It will be apparent at once that as the control rod 112 is moved along its longitudinal axis, the switch leaf 57 and, consequently, the stationary contact 56, are moved toward or away from the movable contact 55, with the result that the temperature at which the contacts 55 and 56 are opened can be changed. To permit initial factory adjustment, the control rod 112 is provided with a recess 115 capable of being operated by a suitable wrench, such as the so-called Allen wrench, and this can be accomplished merely by removing the knob 103 and inserting the Allen wrench into the passageway 108 in the control rod sleeve 107. Also, by rotating the knob 103 the position of stationary contact 56 is manually controlled to determine the desired strength of the coffee. The knob 103 has a suitable opening so that adjustment can be made without removing knob 103.

In order to provide a suitable housing and dial arrangement cooperative with the knob 103, there is provided an escutcheon member 116, which is provided with suitable fastening means 117 (see Fig. 6 of the drawings) for securing the same to the bottom cover 18. Suitable speed nuts 118 cooperate with the fastening means 117. This escutcheon plate includes an opening for receiving the shank 103a of the knob 103, and also includes an arcuate recess 119 for receiving a pin 120 secured to the knob 103. The recess 119 has such an arcuate extent as to limit the maximum clockwise and counterclockwise rotation of the knob 103. Preferably also, a dial member 122 is supported in the escutcheon 116, which dial member is preferably formed of a translucent material so that light from the bulb 95 may be visible therethrough when the heating element 26 is energized. Suitable indicia, such as "Milder" and "Stronger," may be applied to the dial 122, as indicated in Fig. 1 of the drawings.

In accordance with the present invention, unique means are provided for retaining the knob 103 in position and yet permitting ready removal thereof for removing the bottom cover 18. To this end there is provided a removable leaf spring member 125 which is insertable within a recess 126 defined between the bottom portion of the escutcheon 116 and the bottom cover 118. This leaf spring terminates in a pair of bifurcations 125a, receivable within the peripheral groove 106 in the shank 103a thereby preventing movement of the knob 103 in a direction along the longitudinal axis of the shank 103a. The spring 125 is retained in position by virtue of an integral spring finger 125b which engages a shoulder 130 on the escutcheon 116, as is shown in Fig. 4 of the drawings. This spring locking member 125 is completely hidden from view and yet will permit a repairman to obtain immediate access to the control rod adjustment.

In view of the detailed description included above, the operation of the automatic electric percolator of the present invention will be readily understood by those skilled in the art. It will, moreover, be apparent that the bimetallic element 54 is responsive to the temperature from two sources. First of all, it is responsive to the temperature of the heat lug 58. Secondly, it is responsive to the temperature produced by virtue of current flowing therethrough causing a slight temperature rise, this latter temperature rise being only a matter of a degree or two. One might also say that a third source affects the temperature of the bimetallic element 54, which third source is the lag block 65. This lag block comprises a substantial mass and, hence, has substantial heat capacity. It will be apparent that temperature supplied to the bimetallic element from the heat lug 58 will be affected by virtue of the lag block 65, and will, in effect, produce a lagging response for the bimetallic element 54. When percolator is filled with water, the temperature is normally low enough so that the contacts 55 and 56 are closed. If power is supplied to the terminals 86 and 87, current will flow through the heating element 26. By virtue of the pump operation described above, a small trapped volume of liquid is heated, and percolation begins almost as soon as current is supplied to the heating element 26. However, since the heat lug 58 is connected at a point somewhat removed from the portion of the percolator which is being heated, it will be responsive to the average temperature of the brew or liquid within container 11. Due to the fact that a time delay occurs between the beginning of the percolation process and the time that the average temperature of the liquid within the container 11 reaches the desired brewing temperature, the bimetallic element 54 responds relatively slowly, and the current flowing therethrough has a negligible effect. As the temperature of the heat lug 58 increases, the temperature of the lag block also increases, and, gradually, these elements reach a sufficiently high temperature to cause the bimetallic element 54 to open the switch defined by the contacts 55 and 56. With proper adjustment of the control means, this does not occur until the temperature of the liquid has reached a temperature of the order of 200°. Also, depending upon the strength of the coffee desired or, in other words, the setting of manual control knob 103, this temperature will vary somewhat. It will be apparent that the mass of the lag block 65 will be so proportioned that it compensates for the characteristic "under-shoot" operation of the bimetal 54, thereby preventing the bimetal from shutting off the heating operation prematurely. Thus, a desired lagging response is introduced. When the desired high temperature is reached and the bimetal has opened the switch, the liquid in the vessel 11 will cool due to the fact that ambient temperatures are normally room temperatures. If it is desired to maintain the brewed coffee at somewhere between 160° and 180°, the bimetal 54 will open and close the circuit, maintaining the circuit open for all but a few seconds of each minute. When the circuit is closed due to the temperature dropping below the desired "keep warm" temperature, heat will be supplied by the heating element 26. Since the temperature of heat lug 58 is substantially at the desired serving temperature, as is also the temperature of the lag block 65, the small increase in temperature of the bimetal due to current flow therethrough will open the control switch and the short energized periods of the heating element 26 will supply the small amount of power of the order of forty watts to maintain the coffee hot for serving.

The above-described operation can better be understood by reference to Fig. 10 of the drawings, where the curve A represents the average temperature of the liquid in vessel 11, and the curve B represents the temperature of the bimetallic element 54 during a coffeemaking operation. It will be noted that the temperature of the bimetallic element 54 lags the temperature of the liquid so that the liquid reaches about 200° F. or 205° F. before the switch opens when the bimetallic element reaches a temperature of 160° to 180° F. Thereafter the temperature of the liquid cools while the temperature of the bimetallic element continues to rise. The temperature of the liquid then becomes constant at the selected "keep warm" temperature. The temperature curve B of the bimetallic element in this "keep warm" area is of sawtooth shape due to cyclic operation, and can best be observed from curve C, which is a small section of curve B to a greatly enlarged ordinate scale. The rapid increase of only a degree or two in temperature of the bimetallic element is noted when current flows therethrough followed by slow cooling when the switch is open. Actually, the switch is closed only about ten percent of the time during this "keep warm" period.

By virtue of the novel means for adjusting the control means, and the simple and novel means for obtaining access to the adjustments, a very desirable construction is provided. It will, of course, be apparent to those skilled in the art that with a very inexpensive and simple switch, control in two temperature ranges is provided, the first range being the high temperature brewing range, and the second range being the lower temperature "keep warm" or serving range.

While there has been illustrated and described what at present is believed to be a preferred embodiment of the present invention, numerous changes and modifications will readily occur to those skilled in the art. It is aimed in the appended claims to cover all those changes and modifications which fall within the true spirit and scope of the present invention.

What is claimed as new and desired to be secured by Letters Patent of the United States is:

1. An automatic coffee maker comprising a vessel for containing fluid to be heated, a single heating means for heating said fluid disposed in heat conducting relationship with said vessel, a bimetallic element supported from said vessel and disposed in thermal conducting relationship therewith so as to be responsive to the temperature of said vessel and said fluid contained therein, and heat storage means comprising a compact mass of metal in direct thermal conductive relationship with said bimetallic element but out of direct thermal conductive relationship with said vessel to provide a means for delaying the operation of said bimetallic element in response to heating of said fluid upon initial heating of said vessel until said mass of metal reaches a predetermined temperature.

2. An automatic coffee maker of the type including a fluid pump comprising a vessel containing fluid to be heated, electrical circuit means for heating said fluid, a bimetallic element included in said circuit and heated by current flowing therethrough, said element controlling said circuit, heat conducting means in thermal conducting relationship with said vessel, means for heating said bimetallic element from said heat conducting means, and heat storage means comprising a mass of metal in constant direct thermal conductive relationship with said bimetallic element and out of direct thermal conductive relationship with said vessel to provide a means for delaying the operation of the bimetallic element upon initial heating of said vessel by said electrical circuit means.

3. An automatic coffee maker of the type comprising a vessel containing fluid to be heated, electric heating means for heating said fluid, electric circuit means for energizing said heating means, heat responsive means forming a portion of said electric circuit, said means opening said circuit at a predetermined temperature, heat conducting means in thermally conducting relationship with said vessel and hence with fluid contained in said vessel, means for heating said heat responsive means from said heat conducting means, and heat storage means comprising a mass of metal in direct heat transferring relationship with said heat responsive means but out of direct thermal conductive relationship with said vessel, said heat storage means providing a time delay between the attainment of a selected temperature by said fluid and by said heat responsive means, said time delay enabling said heat responsive means to refrain from initially opening said circuit at said predetermined temperature but opening said circuit at a temperature of said vessel which is higher than said predetermined temperature.

4. An automatic coffee maker of the type including a fluid pump comprising a vessel containing a fluid to be heated, electric heating means for heating said fluid, electric circuit means for energizing said heating means, a bimetallic element forming a portion of said electric circuit, said element opening said circuit at a predetermined temperature, heat conducting means in thermally conducting relationship with said vessel and said bimetallic element, means for insulating said bimetallic element to permit it to conduct electric current flowing to said heating means, and heat storage means comprising a mass of metal in direct heat transfer relationship with said bimetallic element but out of direct heat transfer relationship with said vessel, said heat storage means providing a time delay between the attainment of a selected temperature by said fluid and by said element, said time delay enabling said element to open said circuit at said predetermined temperature and to prevent said element from attaining initially a temperature substantially higher than said predetermined temperature while permitting said fluid initially to attain said selected temperature higher than said predetermined temperature.

5. A coffee percolator comprising a vessel for containing a liquid to be heated, electric heating means for heating said vessel, electric circuit means for energizing said heating means, heat responsive means electrically connected in said circuit and mounted to open and close said circuit in accordance with variations in temperature of said vessel, said heat responsive means being increased in temperature in response to the flow of current therethrough, movable electrically conductive means normally engaging said heat responsive means for selecting the temperature at which the said heat responsive means is rendered effective to control said circuit, thermal conducting means mounted on said vessel and connected to said heat responsive means, electrical insulating means being interposed between said heat conducting means and said heat responsive means to permit current for said heating means to flow through said heat responsive means, and a mass of heat conducting material in direct heat exchange relationship with said heat responsive means at a position spaced from said insulating means and out of direct heat transfer relationship with said vessel, said mass of material delaying the increase in temperature of said element in response to the temperature of said liquid by conducting said heat away from said heat responsive means so as to permit said liquid to be heated to a selected temperature higher than the predetermined temperature at which said heat responsive means operates to open said circuit, said heat responsive means subsequently opening and closing said circuit for said electric heating means in response to heat supplied thereto by current flowing therethrough and by heat from said vessel to maintain said liquid at said predetermined temperature.

6. A coffee percolator comprising a vessel for containing a liquid to be heated, electric means for heating said liquid, electric circuit means for energizing said heating means, heat responsive means electrically connected in said circuit for opening and closing said circuit in accordance with variations in temperature of said vessel, said heat responsive means being also increased in temperature in response to a flow of current therethrough, means for selecting the temperature at which said heat responsive means is rendered effective to control said circuit, thermal conducting means in heat transmitting relation with said vessel and said heat responsive means, and heat storage means comprising a mass of metal in direct heat exchanging relationship with said heat responsive means at a position spaced from said thermal conducting means and out of direct heat exchange relationship with said vessel, said heat storage means delaying the increase in temperature of said heat responsive means in accordance with the initial increase in temperature of said vessel and the liquid contained therein to permit said liquid to be heated to a percolating temperature higher than the selected temperature at which said heat responsive means is effective to open said circuit, said heat responsive means subsequent to the attainment of said percolating temperature being thereafter varied in temperature by heat from said vessel and by the flow of current therethrough cyclically to open and close said electric circuit to maintain the temperature of said liquid and vessel at said selected temperature.

7. A coffee percolator in which fluid is heated to a first high percolating temperature during brewing of the coffee and in which the fluid is thereafter maintained at a second lower temperature suitable for drinking, comprising a vessel for containing said fluid, electric heating means for heating said fluid, circuit means for energizing said heating means, an electrically conductive heat responsive element in said circuit for completing and interrupting said circuit, said element varying in temperature in part in accordance with the flow of current therethrough, means for transmitting heat from said vessel to said element, heat storing means comprising a mass of metal in direct heat transfer relation with said element but out of direct heat transfer relationship with said vessel, said heat storing means being initially adapted to prevent heat from said vessel from reaching said element whereby said fluid reaches said first high temperature before the temperature of said element reaches said second lower temperature, said element being thereafter operated approximately at said second temperature at least in part under the control of the current flowing therethrough.

8. In an electric coffee maker of the percolator type comprising a vessel for heating liquid therein, a heat conducting stud of relatively small cross section compared to the area of the bottom of said vessel, means for securing said stud to the center of said bottom with a first portion thereof extending into said vessel and a second portion extending below the bottom of said vessel, a pump well within the first portion of said stud, a heating element in intimate heat exchange relationship with the second portion of said stud, thermoresponsive control means supported from the bottom of said vessel at a position remote from said heating element for controlling the energization of said heating element, and a heat barrier surrounding said stud and heating element to prevent said thermoresponsive control means from being affected by radiation from said heating element and for concentrating heat energy at the central portion of the bottom of said vessel.

References Cited in the file of this patent

UNITED STATES PATENTS

| | | |
|---|---|---|
| 1,008,267 | Holley | Nov. 7, 1911 |
| 1,385,999 | Howard | Aug. 2, 1921 |
| 1,448,389 | Colby | Mar. 13, 1923 |
| 1,475,334 | Warner | Nov. 27, 1923 |
| 1,681,951 | Preston | Aug. 28, 1928 |
| 1,692,781 | Lamb et al. | Nov. 20, 1928 |
| 1,696,451 | Rankin | Dec. 25, 1928 |
| 1,731,882 | Backer | Oct. 15, 1929 |
| 1,743,073 | Simmons | Jan. 7, 1930 |
| 1,915,854 | Gorman | June 27, 1933 |
| 1,958,081 | Denison | May 8, 1934 |
| 2,076,096 | Samuels et al. | Apr. 6, 1937 |
| 2,107,924 | Adams | Feb. 8, 1938 |
| 2,212,100 | Keaton | Aug. 20, 1940 |
| 2,213,723 | Smith | Sept. 3, 1940 |
| 2,281,319 | Newell | Apr. 28, 1942 |
| 2,312,555 | Jepson | Mar. 2, 1943 |
| 2,386,278 | Strother | Oct. 9, 1945 |
| 2,526,566 | Kolisch | Oct. 17, 1950 |
| 2,565,638 | Victory | Aug. 28, 1951 |
| 2,658,134 | Kircher | Nov. 3, 1953 |
| 2,730,610 | Farr et al. | Jan. 10, 1956 |